US009284402B2

(12) United States Patent
Downey et al.

(10) Patent No.: US 9,284,402 B2
(45) Date of Patent: Mar. 15, 2016

(54) HIGH MOLECULAR WEIGHT CASTOR OIL-BASED POLYOLS AND USES THEREOF

(75) Inventors: William J. Downey, Somerset, NJ (US); Haibin Yu, Chapel Hill, NC (US); Christofer S. Megson, Berkeley Heights, NJ (US)

(73) Assignee: Vertellus Specialties Inc., Indianapolis, IN (US)

( * ) Notice: Subject to any disclaimer, the term of this patent is extended or adjusted under 35 U.S.C. 154(b) by 46 days.

(21) Appl. No.: 13/982,079

(22) PCT Filed: Jan. 27, 2012

(86) PCT No.: PCT/US2012/022878
§ 371 (c)(1),
(2), (4) Date: Jul. 26, 2013

(87) PCT Pub. No.: WO2012/103426
PCT Pub. Date: Aug. 2, 2012

(65) Prior Publication Data
US 2013/0310520 A1    Nov. 21, 2013

Related U.S. Application Data

(60) Provisional application No. 61/436,927, filed on Jan. 27, 2011.

(51) Int. Cl.
| | |
|---|---|
| C08G 18/64 | (2006.01) |
| C08L 91/00 | (2006.01) |
| C08G 18/69 | (2006.01) |
| C08G 18/76 | (2006.01) |
| C08G 63/21 | (2006.01) |
| C08G 18/65 | (2006.01) |
| C08G 18/36 | (2006.01) |

(52) U.S. Cl.
CPC ............... *C08G 18/64* (2013.01); *C08G 18/36* (2013.01); *C08G 18/6576* (2013.01); *C08G 18/69* (2013.01); *C08G 18/7664* (2013.01); *C08G 63/21* (2013.01); *C08L 91/00* (2013.01)

(58) Field of Classification Search
CPC ........................... C08G 18/36; C08G 18/6547
USPC ....................................................... 525/131
See application file for complete search history.

(56) References Cited

U.S. PATENT DOCUMENTS

| | | | | |
|---|---|---|---|---|
| 3,914,335 | A * | 10/1975 | Tugukuni et al. | 525/293 |
| 4,533,598 | A * | 8/1985 | Downey et al. | 428/380 |
| 4,603,188 | A * | 7/1986 | Kusakawa | C08G 18/6576 528/60 |
| 4,650,690 | A * | 3/1987 | Bams | A23D 7/003 426/602 |
| 4,666,968 | A * | 5/1987 | Downey et al. | 524/296 |
| 4,705,723 | A * | 11/1987 | Brauer et al. | 428/375 |

(Continued)

FOREIGN PATENT DOCUMENTS

| | | |
|---|---|---|
| CN | 101611192 A | 12/2009 |
| CN | 101743263 A | 6/2010 |

OTHER PUBLICATIONS

PCT Search Report and Written Opinion for PCT/US2012/022878, completed May 6, 2012.

*Primary Examiner* — Mike M Dollinger
(74) *Attorney, Agent, or Firm* — Barnes & Thornburg LLP (57) ABSTRACT

Castor oil-based polyol polymer compositions and their use in processes for preparing polyurethane compounds with modified properties (e.g. tensile strength, hydrolytic stability, and the like) are described.

43 Claims, 2 Drawing Sheets

(56) References Cited

U.S. PATENT DOCUMENTS

| | | | | |
|---|---|---|---|---|
| 4,705,724 A | * | 11/1987 | Downey et al. | 428/375 |
| 4,742,112 A | * | 5/1988 | Brauer et al. | 524/705 |
| RE33,354 E | * | 9/1990 | Downey et al. | 428/375 |
| RE33,754 E | * | 11/1991 | Brauer et al. | 428/380 |
| RE33,755 E | * | 11/1991 | Downey et al. | 524/296 |
| RE33,761 E | * | 12/1991 | Brauer et al. | 524/310 |
| 5,504,145 A | * | 4/1996 | Treasurer | C08G 18/0823 427/393 |
| 7,462,679 B1 | * | 12/2008 | Xiao | C08G 18/0823 524/589 |
| 8,236,866 B2 | | 8/2012 | Casati et al. | |
| 9,080,087 B2 | * | 7/2015 | Varkey | C08G 18/12 |
| 2006/0017201 A1 | | 1/2006 | Wu et al. | |
| 2006/0270747 A1 | * | 11/2006 | Griggs | C08G 18/36 521/172 |
| 2009/0286940 A1 | | 11/2009 | Frings et al. | |
| 2010/0086708 A1 | * | 4/2010 | Jenkines et al. | 428/17 |
| 2010/0216905 A1 | | 8/2010 | Kuwamura et al. | |
| 2010/0317760 A1 | * | 12/2010 | Tanguay et al. | 521/172 |
| 2012/0058925 A1 | * | 3/2012 | Takagi | C10M 141/06 508/527 |
| 2012/0208957 A1 | * | 8/2012 | Berard et al. | 524/745 |
| 2013/0202893 A1 | * | 8/2013 | Rihan | C08G 18/36 428/423.1 |

\* cited by examiner

HIGH MOLECULAR WEIGHT CASTOR OIL-BASED POLYOLS AND USES THEREOF

CROSS-REFERENCE TO RELATED APPLICATIONS

This application is a national stage entry under 35 USC §371(b) of International Application No. PCT/US2012/022878, filed Jan. 27, 2012, which claims priority under 35 U.S.C. §119(e) to U.S. Provisional Application Ser. No. 61/436,927, entitled "High Molecular Weight Castor Oil-Based Polyols And Uses Thereof," filed Jan. 27, 2011. The entirety of the disclosures of these applications are incorporated herein by reference.

BACKGROUND

Polyols are compounds with multiple hydroxyl functional groups available for organic reactions. Among the naturally occurring polyols, castor oil is one of the most prevalent. Additionally, castor oil undergoes most of the reactions that alcohols do, including one of the most industrially important ones, which is the reaction with isocyanate-functional materials to make polyurethanes.

Polyurethanes, resulting from the polyaddition of polyisocyanates and polyol compounds, are broadly used in the form of reactive one or two component systems as used in adhesives, sealing materials, durable elastomeric wheels and tires, automotive suspension bushings, electrical potting compounds, Spandex fibers, seals, gaskets, carpet underlay, hard plastic parts, decorative or protective coatings and floorings. In each of these applications, their resistance against ageing and attack by chemical substances, such as for example water, and environmental conditions are of great importance.

Currently, polybutadiene-based polyols are commonly used to produce polyurethane compounds with excellent hydrolytic stability. Unfortunately, the use of these polyols in the production of polyurethane is limited by the inherently high viscosity, limited tensile and elongation properties, and limited compatibility with other types of polyols.

Accordingly, there is a need for a polyol or polyol mixture which can be used for the production of polyurethane compounds, and has lower viscosity and provides polyurethane compounds with improved tensile and elongation properties over polyurethanes compounds derived from polybutadiene-based polyols, while maintaining excellent hydrolytic stability properties.

Almost all of today's commercially polybutadiene-based polyols are produced from petroleum. The depletion of petroleum combined with its increasing price has encouraged efforts at development of polymeric material from renewable natural resources.

Accordingly, there is a need for polyols or polyol mixtures which can be prepared from renewable natural resources, and which maintain excellent hydrolytic stability of the polyurethane compounds derived from the polyols or polyol mixtures.

DESCRIPTION OF THE DRAWINGS

The features and advantages of the present disclosure, and the manner of attaining them, will be more apparent and better understood by reference to the following descriptions taken in conjunction with the accompanying figures, wherein.

DETAILED DESCRIPTION

Described herein are polymeric polyols, derived from castor oil, which alone or in a mixture, can be used to prepared polyurethanes with improved properties (e.g. tensile strength, hydrolytic stability, and the like). For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The disclosure of the present application provides various polyol polymer compositions and uses thereof. Specifically, castor oil-based polyol polymer compositions and their use in the creation of polyurethane compounds are described.

According to at least one embodiment of a polyol polymer of the present disclosure, a polyol polymer comprises a naturally-occurring triglyceride principally of ricinoleic acid having a molecular weight greater than about 900 Da, and a hydroxyl value below about 130, and a hydrocarbon polyol.

As used herein, the term "hydrocarbon polyol" means any C2 to C6 straight or branched chain aliphatic hydrocarbon, which includes at least two hydroxyl groups. Further, in at least one embodiment, a hydrocarbon polyol may be a four carbon straight or branched chain aliphatic hydrocarbon with at least two hydroxyl groups. Moreover, at least one exemplary embodiment of a hydroxyl polyol is a polybutadiene-based polyol.

It is important to note that while the use of polyols derived from castor oil. has previously been described, these prior art polyols are synthetic derived esters of ricinoleic acid which do not include naturally occurring glycerides, and have a low molecular weight (i.e., less than 900 Da) and high hydroxyl value (i.e., above 130), thus limiting the types of properties available.

In illustrative embodiments of castor oil-based polyols described herein, the castor oil-based polyols were designed as higher molecular weight polyols which achieved lower hardness performance than castor oil or other prior art polyol derivatives of castor oil. These castor oil-based polyol embodiments are generated by reacting fatty acids onto the castor oil molecule. As used herein, the term "fatty acid(s)" means any fatty acid having at least one hydroxyl group. Further, a fatty acid in at least one illustrative embodiment may be Ricinoleic acid, Oleic acid, Linoleic acid, Linolenic acid, Stearic acid, Palmitic acid, Dihydroxystearic acid, or any fatty acid of castor oil, where the fatty acid has at least one hydroxyl group. Exemplary castor oil-based polyol embodiments produced by this process range in hydroxyl values from as high as 125 to as low as 20 mg KOH/g (See Table 1). Additional illustrative embodiments of the castor oil-based polyols of the present disclosure may have a hydroxyl value consisting of about 20 to about 125, about 25 to about 120, about 30 to about 110, about 40 to about 100, about 50 to about 90, about 50 to about 80, about 60 to about 80, about 52, about 78, and about 109 mg KOH/g.

In at least one embodiment of a castor oil-based polyol of the present disclosure, the polyol may have a molecular weight selected from the group consisting of above 900 to about 4000 Da, about 1300 to about 3500 Da, about 1700 to about 3000, about 2600 to about 3000 (See Table 2). Exemplary polyols of the present disclosure may also be considered varying molecular weights of glyceryl polyricinoleate. Among the exemplary embodiments of the castor-oil based polyols described herein, D-1000 (Vertellus Specialties Inc.) has a molecular weight of 910, GR-110 (Vertellus Specialties Inc.) has a molecular weight of 1300, GR-80 (Vertellus Specialties Inc.) has a molecular weight of 1700, GR-50 (Vertellus Specialties Inc.) has a molecular weight of 2600, and GR-35 (Vertellus Specialties Inc.) has a molecular weight of 3500. The D and GR embodiments as shown herein (D-1000, GR-110, GR-80, GR-50, and GR-35) may also be referred to as Polycin® polyols (Vertellus Specialties Inc.). Further, Castor Polyols B-D (Vertellus Specialties Inc.), as shown in Table 2, have molecular weights of between 2000 and 4000 Da, and hydroxyl values of between 20 and 60.

Figure 1:
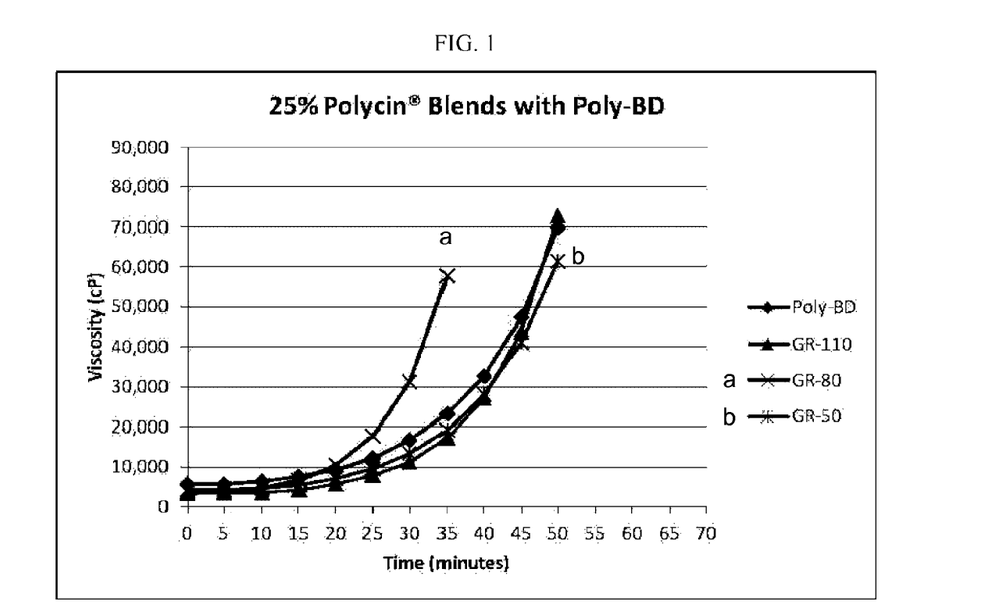
FIG. 1 shows a graphical depiction of the effect on viscosity and reactivity of polyol combination blends according to at least one embodiment of the present disclosure.
Figure 2:
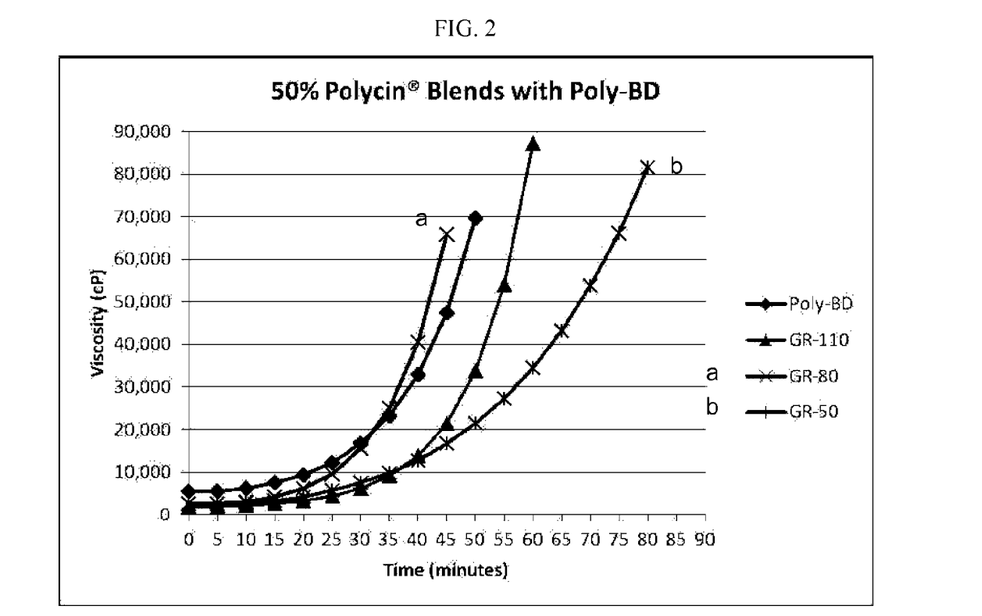
FIG. 2 shows a graphical depiction of the effect on viscosity and reactivity of polyol combination blends according to at least one embodiment of the present disclosure.

Exemplary embodiments of castor oil-based polyols of the present disclosure have at least one property of the group consisting of significantly lower viscosity than known, higher molecular weight, castor oil-based polyols, a wide compatibility with polybutadiene-based polyols, and improved tensile and elongation properties of the resulting polyurethane when compared with polyurethanes produced by polybutadiene polyols alone. The decrease in viscosity of embodiments of castor oil-based polyols of the present disclosure is depicted in FIGS. 1 and 2 (see also Table 1). Further, the exemplary castor oil-based polyols maintain excellent hydrolytic stability with low moisture absorption and higher hardness retention (as shown in Tables 4 and 5), not noted for polyester type polyols.

Embodiments of castor oil-based polyols of the present disclosure created through addition polymerization with fatty acid(s) have an improved compatibility significantly and unexpectedly with polybutadiene-based polyols over prior art castor oil-based polyols. Further, lower viscosity and improved physical properties were realized in exemplary polymers of castor oil-based polyol embodiments with polybutadiene-based polyols. Although there are now more ester linkages in these higher molecular weight polyols, hydrolytic stability in the blends with polybutadiene-based polyurethanes was retained. These improvements in characteristics and performance properties result in new capabilities for products, such as polyurethane coatings, adhesives, and sealants.

An illustrative method of producing a polymer polyol of the present disclosure includes heating of castor oil with a fatty acid and an esterification catalyst to produce a castor oil-based polyol and combining the castor oil-based polyol with a hydrocarbon polyol. The method, according to at least one embodiment, includes the steps of heating and agitating castor oil in a reactor, adding a fatty acid to the heated castor oil, adding an esterification catalyst to the castor oil/fatty acid mixture, and reacting the mixture until water is no longer generated and the acid value drops below about 5. These resulting steps function to produce an illustrative embodiment of a castor oil-based polyol, which can be combined with a hydrocarbon polyol to produce a polymer polyol. The step of heating of the castor oil/fatty acid mixture can be carried out at about 180° C. or above in at least one embodiment. Additionally, the reactor used in this method may be a glass reactor outfitted with a cooling condenser having a feed to a collection flask. Further, the fatty acid as used in this method may be any fatty acid having at least one hydroxyl group.

D1000 (i.e Castor Polyol A) is a triglyceride diol with a theoretical hydroxyl value of 123. Under controlled vacuum and heat conditions, Polycin D1000 is produced directly from castor oil with an acidic catalyst.

Previously, it has been demonstrated that lower molecular weight, synthetically derived esters of ricinoleic acid which do not include naturally occurring glycerides have an improved compatibility with polybutadiene-based polyols for polyurethane compounds. Despite the fact that the prior art ricinoleic-based polyols may have higher or lower hydroxyl values than castor oil, the prior art ricinoleic-based polyols only have the same or lower molecular weight than castor oil. Additionally, castor oil itself has limited compatibility with polybutadiene-based polyols. Accordingly, it was believed by those in the art that higher molecular weight derivatives would have the same or lower compatibility with polybutadiene-based polyols.

TABLE 1

Physical Properties of Exemplary Polyol Embodiments

| Polycin ® Property | D-1000 | GR-110 | GR-80 | GR-50 | GR-35 |
| --- | --- | --- | --- | --- | --- |
| Hydroxyl Value | 125 | 109 | 78 | 52 | 38 |
| Acid Value | 3 | 1.5 | 1.5 | 2 | 2 |
| Viscosity (cP, 25° C.) | 425 | 1000 | 1050 | 1400 | 2000 |
| Functionality | 2 | 2.6 | 2.4 | 2.2 | 2.0 |
| Color (Gardner) | 3 | 4 | 4 | 6 | 6 |
| Specific Gravity (25° C./25° C.) | 0.940 | 0.948 | 0.946 | 0.943 | 0.941 |
| Iodine Value | | 93 | 92 | 81 | 93 |
| Renewable Content (%) | 100 | 100 | 100 | 100 | 100 |

TABLE 2

Relative Compatability Properties of Exemplary Polyol Embodiments

| Polyol/R-45HTLO | MW | 10/90 | 25/75 | 35/65 | 50/50 | 60/40 | 75/25 | 90/10 |
| --- | --- | --- | --- | --- | --- | --- | --- | --- |
| Castor Oil | 928 | 1 | 2 | Split | Split | Split | Split | Split |
| Castor Polyols | | | | | | | | |
| GR-35 | 3500 | 1 | — | — | 1 | — | — | 2 |
| GR-50 | 2600 | 1 | — | 1 | 2 | — | — | 3 |
| GR-80 | 1800 | 1 | 1 | 1 | 3 | 3 | 4 | 4 |
| GR-110 | 1300 | — | 1 | — | 3 | — | Split | Split |
| Castor Polyol A[1] | 910 | 1 | 2 | 2 | 3 | Split | Split | Split |
| Other Higher MW Castor Polyols | | | | | | | | |
| Castor Polyol B | 2000 | 1 | 2 | 2 | 3 | 3 | Split | Split |
| Castor Polyol C | 3000 | 2 | 2 | 2 | 4 | Split | Split | Split |
| Castor Polyol D | 4000 | Split | Split | Split | Split | Split | Split | Split |
| Lower MW Castor Polyols | | | | | | | | |
| Castor Polyol E | 800 | 1 | 1 | 1 | 3 | 4 | Split | Split |
| Higher MW Polyether Polyols | | | | | | | | |
| Polyether Diol M | 1000 | — | 1 | — | 3 | Split | Split | Split |
| Polyether Diol N | 2000 | — | — | — | 3 | 4 | Split | Split |
| Polyether Triol P | 1500 | — | 1 | — | Split | Split | Split | Split |

TABLE 2-continued

Relative Compatability Properties of Exemplary Polyol Embodiments

| Polyol/R-45HTLO | MW | 10/90 | 25/75 | 35/65 | 50/50 | 60/40 | 75/25 | 90/10 |
|---|---|---|---|---|---|---|---|---|
| Polyether Triol Q | 3000 | — | 1 | — | 3 | Split | Split | Split |
| Other Polyol | | | | | | | | |
| Voranol 220-530 | | 1 | 1 | 4 | Split | Split | Split | Split |

"—" = Sample not made
Compatible Appearance: 1 = Clear, 2 = Slightly Hazy, 3 = Hazy, 4 = Very Hazy
Incompatible Appearance: Split = 2 phase
[1]The term Castor Polyol A refers to the same material labeled in D-1000 in Tables 1, 3 and 4.

Castor oil and castor oil-based polyols in the prior art have molecular weights of less than 900 and hydroxyl values of 140 and above. Due to changes in these characteristics in the exemplary castor oil-based polyol embodiments, the exemplary polyols have an improved compatibility over castor oil with polybutadiene-based polyols. Significantly, building the molecular weight of castor oil-based polyols higher than 900 and lowering the hydroxyl value below 130 is an opposite approach to that currently used in the art. Using fatty acid polymerization with castor oil unexpectedly maintained low viscosity and improved compatibility with the polybutadiene-based polyols. Although there are now more ester linkages in the exemplary castor oil-based polyols, hydrolytic stability in the polybutadiene/castor oil-based polyol blends was retained, while tensile and elongation properties were improved.

Although these exemplary embodiments of castor oil-based polyols of the present disclosure carry the hydrophobic nature of castor oil, there are many more ester linkages in each compound than are in castor oil. These ester linkages add polarity and hydrolyzable linkages that could compromise compatibility with hydrocarbon-based polyols and hydrolytic stability of resulting polyurethanes. Despite these ester linkages, exemplary polyol embodiments of the present disclosure were shown to be compatible with polybutadiene-based polyols to at least a 60% blend level (see Table 2). Further, the higher the molecular weight of the exemplary polyol the better the compatibility, to the point that several polyols were completely miscible with the polybutadiene-based polyol. Castor oil itself is only compatible with polybutadiene-based polyols to a 25% blend level.

In at least one exemplary embodiment of the present disclosure, the relative concentrations of an embodiment of a castor oil-based polyol to the hydrocarbon polyol may be selected from the group consisting of about 1% castor oil-based polyol to about 99% hydrocarbon polyol, about 5% castor oil-based polyol to about 95% hydrocarbon polyol, about 10% castor oil-based polyol to about 90% hydrocarbon polyol, about 15% castor oil-based polyol to about 85% hydrocarbon polyol, about 20% castor oil-based polyol to about 80% hydrocarbon polyol, about 25% castor oil-based polyol to about 75% hydrocarbon polyol, about 30% castor oil-based polyol to about 70% hydrocarbon polyol, about 40% castor oil-based polyol to about 60% hydrocarbon polyol, about 50% castor oil-based polyol to about 50% hydrocarbon polyol, about 60% castor oil-based polyol to about 40% hydrocarbon polyol, about 70% castor oil-based polyol to about 30% hydrocarbon polyol, about 80% castor oil-based polyol to about 20% hydrocarbon polyol, about 90% castor oil-based polyol to about 10% hydrocarbon polyol, about 95% castor oil-based polyol to about 5% hydrocarbon polyol, and about 99% castor oil-based polyol to about 1% hydrocarbon polyol.

At least one embodiment of castor oil-based polyols of the present disclosure may be a hydrophobic polyester compound based on castor oil that can produce polyurethanes of lower hardness and strength than with castor oil.

According to at least one method of the production of a polyurethane of the present disclosure, the method comprises the steps of (1) forming a polymer polyol comprising a castor oil-based polyol having a molecular weight greater than 900 Da and a hydroxyl value below 130, and a hydrocarbon polyol having a two carbon to six carbon straight or branched chain aliphatic hydrocarbon with at least one hydroxyl group, and (2) curing the polymer polyol with isocyanate to produce a polyurethane.

The method of producing a polyurethane compound comprises the steps of combining a stoichiometric ratio of the polymer polyol with the isocyanate compound such that there are relatively equal portions of reactive functional groups. The reactive functional group of the polymer polyol is the hydroxyl group, and the reactive functional group of the isocyanate compound is the isocyanate group. The two combined components are mixed together until they form a homogeneous mixture. The process of polymerization, referred to as the curing step, occurs as the two reactive functional groups react with one another until they are completely consumed. For polyurethanes this curing process typically takes one week at 25° C., but can be accelerated using higher temperatures.

Figure 3:
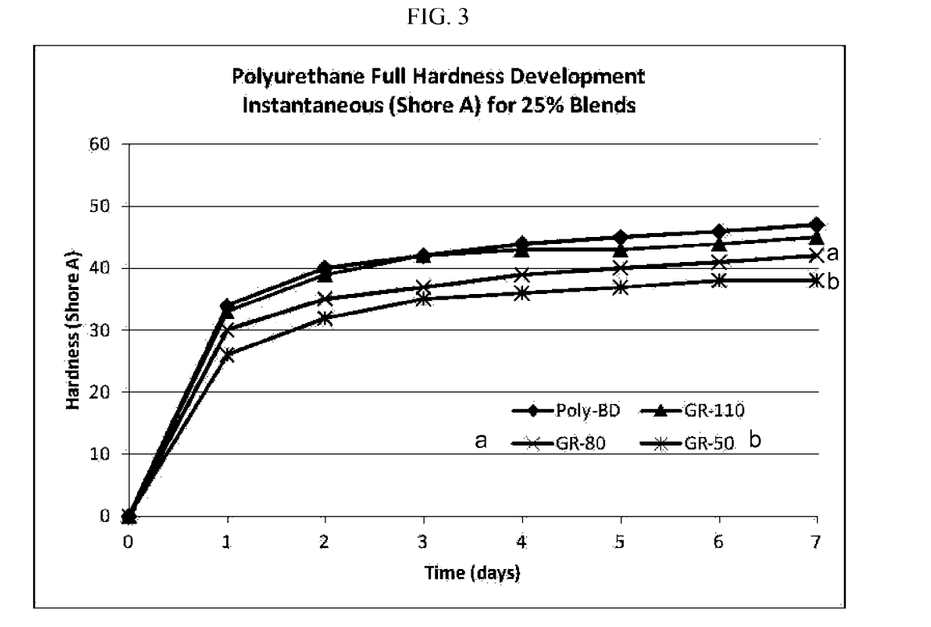
FIG. 3 shows a graphical depiction of a hardness cure profile of polyol combination blends according to at least one embodiment of the present disclosure.
Figure 4:
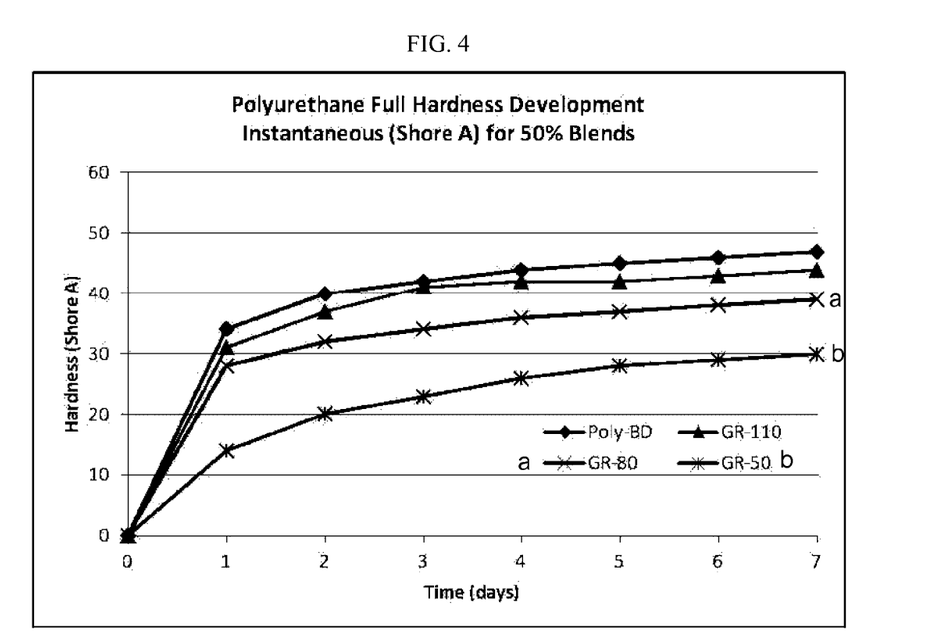
FIG. 4 shows a graphical depiction of a hardness cure profile of polyol combination blends according to at least one embodiment of the present disclosure.

Isocyanate-cured blends of the exemplary castor oil-based polyol embodiments with hydrocarbon polyols, such as polybutadiene-based polyols, produce products (such as polyurethanes) with higher or lower tensile strengths depending on the molecular weight castor oil-based polyol chosen, but in all cases, the elongation increases. Of note, the selection of isocyanate may also influence the properties of the cured castor oil-based polyol polymer. Such isocyanates, as used herein, may include, but are not limited to, aromatic isocyanates, such as diphenylmethane diisocyanate (MDI), modified MDI, polymeric MDI, or toluene diisocyanate (TDI); or aliphatic isocyanates, such as hexamethylene diisocyanate (HDI), methylene bis(cyclohexyl isocyanate) ($H_{12}$MDI), or isophorone diisocyanate (IPDI). Hardness cure (Shore A) profiles of 25% and 50% exemplary castor oil-based polyol embodiment blends with Poly-bd® R-45HTLO and cured with polymeric MDI are shown in FIGS. 3 and 4 respectively.

The properties of these components lead to exemplary castor oil-based polyol polymers with lower modulus and higher flexibility than achieved simply by curing the polybutadiene-based polyol alone (See Tables 3-5, in these Tables the polyol labeled D-1000 is the same as the polyol labeled).

TABLE 3

Performance Properties of Exemplary Polyol Polymer Embodiments

| Performance Property[1] | D-1000 | GR-110 | GR-80 | GR-50 | GR-35 |
|---|---|---|---|---|---|
| Hardness (Shore A) | 44 | 50 | 37 | 21 | 7 |
| Tensile Strength (psi) | 167 | 176 | 122 | 66 | 38 |
| Elongation (%) | 78 | 69 | 58 | 82 | 180 |
| Modulus (psi) | 301 | 343 | 286 | 113 | 31 |

[1]Polyols cured with pMDI at 1.05 NCO/OH ratios

To measure the effect of exposure of poly urethane compounds derived from exemplary polyol polymers to harsh environmental conditions, exemplary isocyanate-cured polyol polymer embodiments were exposed to 100° C. and 95% RH conditions for four weeks, which is considered a rigorous test for polyurethane compounds. At a blend level of 25% (See Table 4) exemplary castor oil-based polyol polymers retained at least about 70% of the initial compound hardness or higher, as compared to 75% hardness retention of the polybutadiene-based polyol polymer alone. At a blend level of 50% (See Table 5) the polyurethanes prepared from illustrative polyol polymers retained at least about 40% of the initial compound hardness or higher.

In contrast, polyurethanes prepared from existing prior art castor oil-derived polyol polymers, when tested under similar conditions, exhibit less than 20% hardness retention, or completely revert to a liquid form. Moreover, embodiments of polyurethanes of the present disclosure, exposed to conditions of at least about 100° C. and at least about 95% relative humidity for at least 28 days are capable of maintaining an initial hardness selected from the group consisting of greater than 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, and at least about 99%.

Embodiments of at least one polyurethane of the present disclosure may have a hardness level less than or equal to about 50 Shore A. Further, an embodiment of a polyurethane of the present disclosure may additionally have a tensile strength selected from the group consisting of about 90 to about 300 psi, about 100 to about 250 psi, about 110 to about 220 psi, about 117 to about 211 psi, and about 153 to about 181 psi. Additionally, an embodiment of a polyurethane of the present disclosure may have an elongation property which is selected from the group of between about 55 to about 90%, about 60 to about 89%, about 67% to about 83%, and about 67 to about 77%. Moreover, an embodiment of a polyurethane of the present disclosure may have a modulus selected from the group consisting of about 200 to about 370 psi, about 210 to about 358 psi, about 250 to about 340 psi, and about 290 to about 310 psi.

TABLE 4

Physical Properties of 25% Polyol Embodiments with 75% Poly-bd ® R-45HTLO

| Performance Property[1] | R-45HTLO[3] | D-1000 | GR-110 | GR-80 | GR-50 |
|---|---|---|---|---|---|
| Blend Viscosity (cP, 25° C.) | 7100 | 3980 | 4740 | 4770 | 4950 |
| pMDI Mix Viscosity (cP, 25° C.) | 5600 | — | 3200 | 3700 | 4200 |
| Hardness (Shore A) | 50 | 47 | 50 | 48 | 45 |
| Tensile Strength (psi) | 157 | 160 | 181 | 153 | 153 |
| Elongation (%) | 54 | 71 | 78 | 67 | 83 |
| Modulus (psi) | 454 | 351 | 358 | 339 | 291 |
| Naval Avionics[2] % Hardness Retention | 75 | 60 | 77 | 72 | 68 |
| % Weight Change | +0.07 | +0.29 | +0.20 | +0.15 | +0.15 |

[1]Polyols cured with pMDI at 1.05 NCO/OH ratios
[2]Naval Avionics (NAFI TR-1372) test conducted for 28 days at 100° C. and 95% RH
[3]Control forumulation consisting of 100% Poly- bd ® R-45HTLO polyol

TABLE 5

Physical Properties of 50% Polyol Embodiments with 50% Poly-bd ® R-45HTLO

| Performance Property[1] | R-45HTLO[3] | GR-110 | GR-80 | GR-50 |
|---|---|---|---|---|
| Blend Viscosity (cP, 25° C.) | 7100 | 2920 | 3010 | 3300 |
| pMDI Mix Viscosity (cP, 25° C.) | 5600 | 2000 | 2500 | 2600 |
| Hardness (Shore A) | 50 | 50 | 44 | 37 |
| Tensile Strength (psi) | 157 | 211 | 158 | 117 |
| Elongation (%) | 54 | 89 | 77 | 87 |
| Modulus (psi) | 454 | 357 | 306 | 210 |
| Naval Avionics[2] % Hardness Retention | 75 | 70 | 43 | 38 |
| % Weight Change | +0.07 | +0.42 | +0.24 | +0.25 |

[1]Polyols cured with pMDI at 1.05 NCO/OH ratios
[2]Naval Avionics (NAFI TR-1372) test conducted for 28 days at 100° C. and 95% RH
[3]Control forumulation consisting of 100% Poly- bd ® R-45HTLO polyol In at least one embodiment of castor oil-based polyol polymers of the present disclosure, the castor oil-based polyol polymers may be used in a variety of different applications. Among the applications which may be used with embodiments of castor oil-based polyol polymers include: adhesives, binders, ball cores, foams, liquid castable rubbers, urethane elastomers, reaction injection molding, reinforcement of rubber and urethane elastomers, rollers, automotive applications, coatings, electrical applications, and construction products. The automotive applications may include any one of brake linings, electrical potting and encapsulations, sealants, sound and vibration dampening. Coating applications for use with embodiments of castor oil-based polyols may include can coatings, high solids coatings, maintenance coatings, pipeline coatings, urethane asphalts, water-based coatings, electrocoatings, and waterproof deck coatings. Various electrical applications which may be used with embodiments of castor oil-based polyols include cable filling compounds, coil impregnants, conformal coating compounds, high voltage insulation, and elastomers. Construction applications which may be used with embodiments of castor oil-based polyols include athletic and recreational surfaces, caulks and mastics, elastomeric asphalts, insulating glass sealants, joint and crack sealants, urethane-asphalt emulsions, waterproof membranes, architectural membranes, pond and waste treatment linings, roofing, and spray-on membranes.

Several illustrative embodiments of the invention are described by the following enumermated clauses:

1. A polymer polyol comprising:
a castor oil-based polyol having a molecular weight greater than 900 or greater than 1000 Da and a hydroxyl value below 130 or below 120; and
a hydrocarbon polyol selected from a compound having a two carbon to six carbon straight or branched chain aliphatic hydrocarbon with at least two hydroxyl groups or a polymer consisting of from 1 to 100 monomeric units and at least two hydroxyl groups, where the monomeric unit is a two carbon to six carbon straight or branched chain hydrocarbon.

2. The polymer polyol of clause 1, wherein the castor oil-based polyol has a molecular weight selected from the group consisting of about 900 to about 4000 Da, about 1000 to about 4000 Da, about 1300 to about 3500 Da, about 1700 to about 3000, and about 2600 to about 3000.

3. The polymer polyol of clause 1, wherein the hydroxyl value of the castor oil-based polyol is selected from the group consisting of about 25 to about 125, about 25 to about 120, about 30 to about 110, about 40 to about 100, about 50 to about 90, about 50 to about 80, about 60 to about 80, about 52, about 78, and about 109 mg KOH/g.

4. The polymer polyol of clause 1, wherein the hydrocarbon polyol is a four carbon straight or branched chain aliphatic hydrocarbon with at least two hydroxyl groups.

5. The polymer polyol of clause 1, wherein the hydrocarbon polyol is a polybutadiene-based polyol.

6. The polymer polyol of clause 1, wherein the castor oil-based polyol has a viscosity selected from a value of equal to or greater than about 400 cP or a value greater than or equal to about 1000 cp at 25° C.

7. The polymer polyol of clause 1, wherein the castor oil-based polyol and the hydrocarbon polyol have relative concentrations selected from the group consisting of about 1% castor oil-based polyol to about 99% hydrocarbon polyol, about 5% castor oil-based polyol to about 95% hydrocarbon polyol, about 10% castor oil-based polyol to about 90% hydrocarbon polyol, about 15% castor oil-based polyol to about 85% hydrocarbon polyol, about 20% castor oil-based polyol to about 80% hydrocarbon polyol, about 25% castor oil-based polyol to about 75% hydrocarbon polyol, about 30% castor oil-based polyol to about 70% hydrocarbon polyol, about 40% castor oil-based polyol to about 60% hydrocarbon polyol, about 50% castor oil-based polyol to about 50% hydrocarbon polyol, about 60% castor oil-based polyol to about 40% hydrocarbon polyol, about 70% castor oil-based polyol to about 30% hydrocarbon polyol, about 80% castor oil-based polyol to about 20% hydrocarbon polyol, about 90% castor oil-based polyol to about 10% hydrocarbon polyol, about 95% castor oil-based polyol to about 5% hydrocarbon polyol, and about 99% castor oil-based polyol to about 1% hydrocarbon polyol.

8. A method of producing a polymer polyol, the method comprising the steps of: heating a mixture comprising a castor oil, a fatty acid, and an esterification catalyst; reacting the mixture to produce a castor oil-based polyol having a molecular weight greater than 900 Da or a molecular weigh greater than 1000 Da, and a hydroxyl value below 130 or below 120; and combining the castor oil-based polyol with a hydrocarbon polyol selected from a compound having a two carbon to six carbon straight or branched chain aliphatic hydrocarbon with at least two hydroxyl groups or a polymer consisting of from 1 to 100 monomeric units and at least two hydroxyl groups, where the monomeric unit is a two carbon to six carbon straight or branched chain hydrocarbon.

9. The method of clause 8, wherein the step of heating the mixture is conducted at about 180° C. or above.

10. The method of clause 8, wherein the fatty acid has at least one hydroxyl group.

11. The polymer polyol of clause 8, wherein the castor oil-based polyol has a molecular weight selected from the group consisting of above 900 to about 4000 Da, 1000 to about 4000 Da, about 1300 to about 3500 Da, about 1700 to about 3000, and about 2600 to about 3000.

12. The polymer polyol of clause 8, wherein the hydroxyl value of the castor oil-based polyol is selected from the group consisting of about 25 to about 125, 25 to about 120, about 30 to about 110, about 40 to about 100, about 50 to about 90, about 50 to about 80, about 60 to about 80, about 52, about 78, and about 109 mg KOH/g.

13. The polymer polyol of clause 8, wherein the hydrocarbon polyol is a four carbon straight or branched chain aliphatic hydrocarbon with at least two hydroxyl groups.

14. The polymer polyol of clause 8, wherein the hydrocarbon polyol is a polybutadiene-based polyol.

15. The polymer polyol of clause 8, wherein the castor oil-based polyol has a viscosity of equal to or greater than about 400 cP or a viscosity of equal to or greater than about 1000 cP at 25° C.

16. The polymer polyol of clause 8, wherein the castor oil-based polyol and the hydrocarbon polyol have relative concentrations selected from the group consisting of about 1% castor oil-based polyol to about 99% hydrocarbon polyol, about 5% castor oil-based polyol to about 95% hydrocarbon polyol, about 10% castor oil-based polyol to about 90% hydrocarbon polyol, about 15% castor oil-based polyol to about 85% hydrocarbon polyol, about 20% castor oil-based polyol to about 80% hydrocarbon polyol, about 25% castor oil-based polyol to about 75% hydrocarbon polyol, about 30% castor oil-based polyol to about 70% hydrocarbon polyol, about 40% castor oil-based polyol to about 60% hydrocarbon polyol, about 50% castor oil-based polyol to about 50% hydrocarbon polyol, about 60% castor oil-based polyol to about 40% hydrocarbon polyol, about 70% castor oil-based polyol to about 30% hydrocarbon polyol, about 80% castor oil-based polyol to about 20% hydrocarbon polyol, about 90% castor oil-based polyol to about 10% hydrocarbon polyol, about 95% castor oil-based polyol to about 5% hydrocarbon polyol, and about 99% castor oil-based polyol to about 1% hydrocarbon polyol.

17. A polyurethane comprising the reaction product of:
an isocyanate; and
a polymer polyol comprising:
a castor oil-based polyol having a molecular weight greater than 900 Da and a hydroxyl value below 130 or below 120; and
a hydrocarbon polyol selected from a compound having a two carbon to six carbon straight or branched chain aliphatic hydrocarbon with at least two hydroxyl groups or a polymer consisting of from 1 to 100 monomeric units and at least two hydroxyl groups, where the monomeric unit is a two carbon to six carbon straight or branched chain hydrocarbon.

18. The polyurethane of clause 17, wherein the polyurethane is capable of maintaining at least about 70% of an initial hardness when exposed to at least about 100° C. and at least about 95% relative humidity for at least 28 days.

19. The polyurethane of clause 17, wherein the polyurethane capable of maintaining at least about 40% of an initial hardness when exposed to at least about 100° C. and at least about 95% relative humidity for at least 28 days.

20. The polyurethane of clause 17, wherein the polyurethane has a hardness level less than or equal to about 50 Shore A.

21. The polyurethane of clause 17, wherein the tensile strength of the polyurethane is selected from the group consisting of about 90 to about 300 psi, about 100 to about 250 psi, about 110 to about 220 psi, about 117 to about 211 psi, and about 153 to about 181 psi.

22. The polyurethane of clause 17, wherein the elongation property of the polyurethane is selected from the group consisting of between about 55 to about 90%, about 60 to about 89%, about 67% to about 83%, and about 67 to about 77%.

23. The polyurethane of clause 17, wherein the modulus of the polyurethane is selected from the group consisting of about 200 to about 370 psi, about 210 to about 358 psi, about 250 to about 340 psi, and about 290 to about 310 psi.

24. The polyurethane of clause 17, wherein the isocyanate is selected from the group consisting of diphenylmethane diisocyanate (MDI), modified MDI, polymeric MDI, toluene diisocyanate, hexamethylene diisocyanate, methylene bis (cyclohexyl isocyanate) and isophorone diisocyanate.

25. The polyurethane of clause 17, wherein the castor oil-based polyol has a molecular weight selected from the group consisting of about 900 to about 4000 Da, 1000 to about 4000 Da, about 1300 to about 3500 Da, about 1700 to about 3000, and about 2600 to about 3000.

26. The polyurethane of clause 17, wherein the hydroxyl value of the castor oil-based polyol is selected from the group consisting of about 25 to about 125, 25 to about 120, about 30 to about 110, about 40 to about 100, about 50 to about 90, about 50 to about 80, about 60 to about 80, about 52, about 78, and about 109 mg KOH/g.

27. The polyurethane of clause 17, wherein the hydrocarbon polyol is a four carbon straight or branched chain aliphatic hydrocarbon with at least two hydroxyl groups.

28. The polyurethane of clause 17, wherein the hydrocarbon polyol is a polybutadiene-based polyol.

29. The polyurethane of clause 17, wherein the castor oil-based polyol and the hydrocarbon polyol have relative concentrations selected from the group consisting of about 1% castor oil-based polyol to about 99% hydrocarbon polyol, about 5% castor oil-based polyol to about 95% hydrocarbon polyol, about 10% castor oil-based polyol to about 90% hydrocarbon polyol, about 15% castor oil-based polyol to about 85% hydrocarbon polyol, about 20% castor oil-based polyol to about 80% hydrocarbon polyol, about 25% castor oil-based polyol to about 75% hydrocarbon polyol, about 30% castor oil-based polyol to about 70% hydrocarbon polyol, about 40% castor oil-based polyol to about 60% hydrocarbon polyol, about 50% castor oil-based polyol to about 50% hydrocarbon polyol, about 60% castor oil-based polyol to about 40% hydrocarbon polyol, about 70% castor oil-based polyol to about 30% hydrocarbon polyol, about 80% castor oil-based polyol to about 20% hydrocarbon polyol, about 90% castor oil-based polyol to about 10% hydrocarbon polyol, about 95% castor oil-based polyol to about 5% hydrocarbon polyol, and about 99% castor oil-based polyol to about 1% hydrocarbon polyol.

30. A method of producing a polyurethane, the method comprising the steps of:
forming a polymer polyol comprising:
a castor oil-based polyol having a molecular weight greater than 900 Da or greater than 1000 Da, and a hydroxyl value below 130 or below 120; and
a hydrocarbon polyol selected from a compound having a two carbon to six carbon straight or branched chain aliphatic hydrocarbon with at least two hydroxyl groups or a polymer consisting of from 1 to 100 monomeric units and at least two hydroxyl groups, where the monomeric unit is a two carbon to six carbon straight or branched chain hydrocarbon; and
curing the polymer polyol with isocyanate to produce a polyurethane.

31. The polyurethane of clause 30, wherein the polyurethane is capable of maintaining at least about 70% of an initial hardness when exposed to at least about 100° C. and at least about 95% relative humidity for at least 28 days.

32. The polyurethane of clause 30, wherein the polyurethane capable of maintaining at least about 40% of an initial hardness when exposed to at least about 100° C. and at least about 95% relative humidity for at least 28 days.

33. The polyurethane of clause 30, wherein the polyurethane has a hardness level less than or equal to about 50 Shore A.

34. The polyurethane of clause 30, wherein the tensile strength of the polyurethane is selected from the group consisting of about 90 to about 300 psi, about 100 to about 250 psi, about 110 to about 220 psi, about 117 to about 211 psi, and about 153 to about 181 psi.

35. The polyurethane of clause 30, wherein the elongation property of the polyurethane is selected from the group consisting of between about 55 to about 90%, about 60 to about 89%, about 67% to about 83%, and about 67 to about 77%.

36. The polyurethane of clause 30, wherein the modulus of the polyurethane is selected from the group consisting of about 200 to about 370 psi, about 210 to about 358 psi, about 250 to about 340 psi, and about 290 to about 310 psi.

37. The polyurethane of clause 30, wherein the isocyanate is selected from the group consisting of diphenylmethane diisocyanate (MDI), modified MDI, polymeric MDI, toluene diisocyanate, hexamethylene diisocyanate, methylene bis (cyclohexyl isocyanate) and isophorone diisocyanate.

38. The polyurethane of clause 30, wherein the castor oil-based polyol has a molecular weight selected from the group consisting of above 900 to about 4000 Da, about 1300 to about 3500 Da, about 1700 to about 3000, about 2600 to about 3000.

39. The polyurethane of clause 30, wherein the hydroxyl value of the castor oil-based polyol is selected from the group consisting of about 25 to about 125, about 30 to about 110, about 40 to about 100, about 50 to about 90, about 50 to about 80, about 60 to about 80, about 52, about 78, and about 109 mg KOH/g.

40. The polyurethane of clause 30, wherein the hydrocarbon polyol is a four carbon straight or branched chain aliphatic hydrocarbon with at least two hydroxyl groups.

41. The polyurethane of clause 30, wherein the hydrocarbon polyol is a polybutadiene-based polyol.

42. The polyurethane of claim 30, wherein the castor oil-based polyol and the hydrocarbon polyol have relative concentrations selected from the group consisting of about 1% castor oil-based polyol to about 99% hydrocarbon polyol, about 5% castor oil-based polyol to about 95% hydrocarbon polyol, about 10% castor oil-based polyol to about 90% hydrocarbon polyol, about 15% castor oil-based polyol to about 85% hydrocarbon polyol, about 20% castor oil-based polyol to about 80% hydrocarbon polyol, about 25% castor oil-based polyol to about 75% hydrocarbon polyol, about 30% castor oil-based polyol to about 70% hydrocarbon polyol, about 40% castor oil-based polyol to about 60% hydrocarbon polyol, about 50% castor oil-based polyol to about 50% hydrocarbon polyol, about 60% castor oil-based polyol to about 40% hydrocarbon polyol, about 70% castor oil-based polyol to about 30% hydrocarbon polyol, about 80% castor oil-based polyol to about 20% hydrocarbon polyol, about 90% castor oil-based polyol to about 10% hydrocarbon polyol, about 95% castor oil-based polyol to about 5% hydrocarbon polyol, and about 99% castor oil-based polyol to about 1% hydrocarbon polyol.

The use of exemplary embodiments of higher molecular weight polyol derivatives of castor oil blended with polybutadiene-based polyols produce improvements in compatibility and physical properties, while maintaining hydrolytic stability.

While various embodiments of the compositions of the present disclosure have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. Indeed, this disclosure is not intended to be exhaustive or to limit the scope of the present disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

What is claimed is:

1. A polymer polyol comprising:
    a castor oil-based polyol derived from polymerization by esterification of castor oil and a fatty acid comprising at least one hydroxyl group, the castor oil-based polyol having a molecular weight greater than 900 Da and a hydroxyl value below 130 mg KOH/g; and
    a hydrocarbon polyol selected from a compound having a two carbon to six carbon straight or branched chain aliphatic hydrocarbon with at least two hydroxyl groups or a polymer consisting of from 1 to 100 monomeric units and at least two hydroxyl groups, where the monomeric unit is a two carbon to six carbon straight or branched chain hydrocarbon.

2. The polymer polyol of claim 1, wherein the castor oil-based polyol has a molecular weight selected from the group consisting of 900 to about 4000 Da, about 1300 to about 3500 Da, about 1700 to about 3000 Da, and about 2600 to about 3000 Da.

3. The polymer polyol of claim 1, wherein the hydroxyl value of the castor oil-based polyol is selected from the group consisting of about 25 to about 125 mg KOH/g, about 30 to about 110 mg KOH/g, about 40 to about 100 mg KOH/g, about 50 to about 90 mg KOH/g, about 50 to about 80 mg KOH/g, about 60 to about 80 mg KOH/g, about 52 mg KOH/g, about 78 mg KOH/g, and about 109 mg KOH/g.

4. The polymer polyol of claim 1, wherein the hydrocarbon polyol is a four carbon straight or branched chain aliphatic hydrocarbon with at least two hydroxyl groups.

5. The polymer polyol of claim 1, wherein the hydrocarbon polyol is a polybutadiene-based polyol.

6. The polymer polyol of claim 1, wherein the castor oil-based polyol has a viscosity of equal to or greater than about 400 cP at 25° C.

7. The polymer polyol of claim 1, wherein the castor oil-based polyol and the hydrocarbon polyol have relative concentrations selected from the group consisting of about 1% castor oil-based polyol to about 99% hydrocarbon polyol, about 5% castor oil-based polyol to about 95% hydrocarbon polyol, about 10% castor oil-based polyol to about 90% hydrocarbon polyol, about 15% castor oil-based polyol to about 85% hydrocarbon polyol, about 20% castor oil-based polyol to about 80% hydrocarbon polyol, about 25% castor oil-based polyol to about 75% hydrocarbon polyol, about 30% castor oil-based polyol to about 70% hydrocarbon polyol, about 40% castor oil-based polyol to about 60% hydrocarbon polyol, about 50% castor oil-based polyol to about 50% hydrocarbon polyol, about 60% castor oil-based polyol to about 40% hydrocarbon polyol, about 70% castor oil-based polyol to about 30% hydrocarbon polyol, about 80% castor oil-based polyol to about 20% hydrocarbon polyol, about 90% castor oil-based polyol to about 10% hydrocarbon polyol, about 95% castor oil-based polyol to about 5% hydrocarbon polyol, and about 99% castor oil-based polyol to about 1% hydrocarbon polyol.

8. A method of producing the polymer polyol of claim 1, the method comprising the steps of:
    heating a mixture comprising a castor oil, a fatty acid, and an esterification catalyst;
    reacting the mixture to produce a castor oil-based polyol having a molecular weight greater than 900 Da and a hydroxyl value below 130; and
    combining the castor oil-based polyol with a hydrocarbon polyol selected from a compound having a two carbon to six carbon straight or branched chain aliphatic hydrocarbon with at least two hydroxyl groups or a polymer consisting of from 1 to 100 monomeric units and at least two hydroxyl groups, where the monomeric unit is a two carbon to six carbon straight or branched chain hydrocarbon to produce a polymer polyol.

9. The method of claim 8, wherein the step of heating the mixture is conducted at about 180° C. or above.

10. The method of claim 8, wherein the fatty acid has at least one hydroxyl group.

11. The method of claim 8, wherein the castor oil-based polyol has a molecular weight selected from the group consisting of above 900 to about 4000 Da, about 1300 to about 3500 Da, about 1700 to about 3000, and about 2600 to about 3000.

12. The method of claim 8, wherein the hydroxyl value of the castor oil-based polyol is selected from the group consisting of about 25 to about 125, about 30 to about 110, about 40 to about 100, about 50 to about 90, about 50 to about 80, about 60 to about 80, about 52, about 78, and about 109 mg KOH/g.

13. The method of claim 8, wherein the hydrocarbon polyol is a four carbon straight or branched chain aliphatic hydrocarbon with at least two hydroxyl groups.

14. The method of claim 8, wherein the hydrocarbon polyol is a polybutadiene-based polyol.

15. The method of claim 8, wherein the castor oil-based polyol has a viscosity of equal to or greater than about 400 cP at 25° C.

16. The method of claim 8, wherein the castor oil-based polyol and the hydrocarbon polyol have relative concentrations selected from the group consisting of about 1% castor oil-based polyol to about 99% hydrocarbon polyol, about 5% castor oil-based polyol to about 95% hydrocarbon polyol, about 10% castor oil-based polyol to about 90% hydrocarbon polyol, about 15% castor oil-based polyol to about 85% hydrocarbon polyol, about 20% castor oil-based polyol to about 80% hydrocarbon polyol, about 25% castor oil-based polyol to about 75% hydrocarbon polyol, about 30% castor oil-based polyol to about 70% hydrocarbon polyol, about 40% castor oil-based polyol to about 60% hydrocarbon polyol, about 50% castor oil-based polyol to about 50% hydrocarbon polyol, about 60% castor oil-based polyol to about 40% hydrocarbon polyol, about 70% castor oil-based polyol to about 30% hydrocarbon polyol, about 80% castor oil-based polyol to about 20% hydrocarbon polyol, about 90% castor oil-based polyol to about 10% hydrocarbon polyol, about 95% castor oil-based polyol to about 5% hydrocarbon polyol, and about 99% castor oil-based polyol to about 1% hydrocarbon polyol.

17. A polyurethane comprising the reaction product of:
an isocyanate; and
the polymer polyol of claim 1.

18. The polyurethane of claim 17, wherein the polyurethane is capable of maintaining at least about 70% of an initial hardness when exposed to at least about 100° C. and at least about 95% relative humidity for at least 28 days.

19. The polyurethane of claim 17, wherein the polyurethane is capable of maintaining at least about 40% of an initial hardness when exposed to at least about 100° C. and at least about 95% relative humidity for at least 28 days.

20. The polyurethane of claim 17, wherein the polyurethane has a hardness level less than or equal to about 50 Shore A.

21. The polyurethane of claim 17, wherein the tensile strength of the polyurethane is selected from the group consisting of about 90 to about 300 psi, about 100 to about 250 psi, about 110 to about 220 psi, about 117 to about 211 psi, and about 153 to about 181 psi.

22. The polyurethane of claim 17, wherein the elongation property of the polyurethane is selected from the group consisting of between about 55 to about 90%, about 60 to about 89%, about 67% to about 83%, and about 67 to about 77%.

23. The polyurethane of claim 17, wherein the modulus of the polyurethane is selected from the group consisting of about 200 to about 370 psi, about 210 to about 358 psi, about 250 to about 340 psi, and about 290 to about 310 psi.

24. The polyurethane of claim 17, wherein the isocyanate is selected from the group consisting of diphenylmethane diisocyanate (MDI), modified MDI, polymeric MDI, toluene diisocyanate, hexamethylene diisocyanate, methylene bis(cyclohexyl isocyanate) and isophorone diisocyanate.

25. The polyurethane of claim 17, wherein the castor oil-based polyol has a molecular weight selected from the group consisting of above 900 to about 4000 Da, about 1300 to about 3500 Da, about 1700 to about 3000, and about 2600 to about 3000 Da.

26. The polyurethane of claim 17, wherein the hydroxyl value of the castor oil-based polyol is selected from the group consisting of about 25 to about 125, about 30 to about 110, about 40 to about 100, about 50 to about 90, about 50 to about 80, about 60 to about 80, about 52, about 78, and about 109 mg KOH/g.

27. The polyurethane of claim 17, wherein the hydrocarbon polyol is a four carbon straight or branched chain aliphatic hydrocarbon with at least two hydroxyl groups.

28. The polyurethane of claim 17, wherein the hydrocarbon polyol is a polybutadiene-based polyol.

29. The polyurethane of claim 17, wherein the castor oil-based polyol and the hydrocarbon polyol have relative concentrations selected from the group consisting of about 1% castor oil-based polyol to about 99% hydrocarbon polyol, about 5% castor oil-based polyol to about 95% hydrocarbon polyol, about 10% castor oil-based polyol to about 90% hydrocarbon polyol, about 15% castor oil-based polyol to about 85% hydrocarbon polyol, about 20% castor oil-based polyol to about 80% hydrocarbon polyol, about 25% castor oil-based polyol to about 75% hydrocarbon polyol, about 30% castor oil-based polyol to about 70% hydrocarbon polyol, about 40% castor oil-based polyol to about 60% hydrocarbon polyol, about 50% castor oil-based polyol to about 50% hydrocarbon polyol, about 60% castor oil-based polyol to about 40% hydrocarbon polyol, about 70% castor oil-based polyol to about 30% hydrocarbon polyol, about 80% castor oil-based polyol to about 20% hydrocarbon polyol, about 90% castor oil-based polyol to about 10% hydrocarbon polyol, about 95% castor oil-based polyol to about 5% hydrocarbon polyol, and about 99% castor oil-based polyol to about 1% hydrocarbon polyol.

30. A method of producing a polyurethane, the method comprising the steps of:
forming the polymer polyol of claim 1; and
curing the polymer polyol with isocyanate to produce a polyurethane.

31. The method of claim 30, wherein the polyurethane is capable of maintaining at least about 70% of an initial hardness when exposed to at least about 100° C. and at least about 95% relative humidity for at least 28 days.

32. The method of claim 30, wherein the polyurethane is capable of maintaining at least about 40% of an initial hardness when exposed to at least about 100° C. and at least about 95% relative humidity for at least 28 days.

33. The method of claim 30, wherein the polyurethane has a hardness level less than or equal to about 50 Shore A.

34. The method of claim 30, wherein the tensile strength of the polyurethane is selected from the group consisting of about 90 to about 300 psi, about 100 to about 250 psi, about 110 to about 220 psi, about 117 to about 211 psi, and about 153 to about 181 psi.

35. The method of claim 30, wherein the elongation property of the polyurethane is selected from the group consisting of between about 55 to about 90%, about 60 to about 89%, about 67% to about 83%, and about 67 to about 77%.

36. The method of claim 30, wherein the modulus of the polyurethane is selected from the group consisting of about 200 to about 370 psi, about 210 to about 358 psi, about 250 to about 340 psi, and about 290 to about 310 psi.

37. The method of claim 30, wherein the isocyanate is selected from the group consisting of diphenylmethane diisocyanate (MDI), modified MDI, polymeric MDI, toluene diisocyanate, hexamethylene diisocyanate, methylene bis(cyclohexyl isocyanate) and isophorone diisocyanate.

38. The method of claim 30, wherein the castor oil-based polyol has a molecular weight selected from the group consisting of above 900 to about 4000 Da, about 1300 to about 3500 Da, about 1700 to about 3000, and about 2600 to about 3000 Da.

39. The method of claim 30, wherein the hydroxyl value of the castor oil-based polyol is selected from the group consisting of about 25 to about 125, about 30 to about 110, about 40 to about 100, about 50 to about 90, about 50 to about 80, about 60 to about 80, about 52, about 78, and about 109 mg KOH/g.

40. The method of claim 30, wherein the hydrocarbon polyol is a four carbon straight or branched chain aliphatic hydrocarbon with at least two hydroxyl groups.

41. The method of claim 30, wherein the hydrocarbon polyol is a polybutadiene-based polyol.

42. The method of claim 30, wherein the castor oil-based polyol and the hydrocarbon polyol have relative concentrations selected from the group consisting of about 1% castor oil-based polyol to about 99% hydrocarbon polyol, about 5% castor oil-based polyol to about 95% hydrocarbon polyol, about 10% castor oil-based polyol to about 90% hydrocarbon polyol, about 15% castor oil-based polyol to about 85% hydrocarbon polyol, about 20% castor oil-based polyol to about 80% hydrocarbon polyol, about 25% castor oil-based polyol to about 75% hydrocarbon polyol, about 30% castor oil-based polyol to about 70% hydrocarbon polyol, about 40% castor oil-based polyol to about 60% hydrocarbon polyol, about 50% castor oil-based polyol to about 50% hydrocarbon polyol, about 60% castor oil-based polyol to about 40% hydrocarbon polyol, about 70% castor oil-based polyol to about 30% hydrocarbon polyol, about 80% castor oil-based polyol to about 20% hydrocarbon polyol, about 90% castor oil-based polyol to about 10% hydrocarbon polyol, about 95% castor oil-based polyol to about 5% hydrocarbon polyol, and about 99% castor oil-based polyol to about 1% hydrocarbon polyol.

43. The polymer polyol of claim 1, wherein the castor oil-based polyol has a molecular weight of about 1300 to about 3500 Da and a hydroxyl value of about 25 to about 125 mg KOH/g.

\* \* \* \* \*